United States Patent [19]

Assenheimer et al.

[11] 4,112,879
[45] Sep. 12, 1978

[54] PROCESS FOR THE REGULATION OF THE OPTIMUM OPERATIONAL BEHAVIOR OF AN INTERNAL COMBUSTION ENGINE

[75] Inventors: Jürgen Assenheimer, Vaihingen; Valerio Bianchi, Hochdorf; Johannes Brettschneider, Ludwigsburg; Reinhard Latsch, Vaihingen; Dieter Scherenberg, Stuttgart, all of Germany

[73] Assignee: Robert Bosch GmbH, Stuttgart, Germany

[21] Appl. No.: 661,006

[22] Filed: Feb. 24, 1976

[30] Foreign Application Priority Data

Feb. 24, 1975 [DE] Fed. Rep. of Germany ...... 2507917

[51] Int. Cl.$^2$ ............................................. F02B 3/00
[52] U.S. Cl. ........................... 123/32 EA; 123/32 EH
[58] Field of Search ........ 123/32 EA, 32 EB, 32 ED, 123/32 EJ, 32 EH

[56] References Cited

U.S. PATENT DOCUMENTS

| | | | |
|---|---|---|---|
| 2,884,916 | 5/1959 | Winkler | 123/32 EA |
| 3,500,799 | 3/1970 | Benson | 123/32 EA |
| 3,581,723 | 6/1971 | School | 123/32 EA |
| 3,683,869 | 8/1972 | Kamazuka et al. | 123/32 EH |
| 3,747,576 | 7/1973 | Gordon et al. | 123/32 EH |
| 3,747,577 | 7/1973 | Mauch et al. | 123/32 ED |
| 3,796,199 | 3/1974 | Knapp | 123/32 EA |
| 3,817,099 | 6/1974 | Bubniak et al. | 123/32 EA |
| 3,817,225 | 6/1974 | Priegel | 123/32 EA |
| 3,980,062 | 9/1976 | Wessel et al. | 123/32 EA |

*Primary Examiner*—Samuel W. Engle
*Assistant Examiner*—S. A. Cangialosi
*Attorney, Agent, or Firm*—Edwin E. Greigg

[57] ABSTRACT

A process for controlling the operation of an internal combustion engine based on the volumetric efficiency of the engine to define a primary nominal fuel quantity. The process also includes measuring the fluctuations in the volumetric efficiency. In order to operate the engine in a preferred leaned-out condition, a nominal set-point value of the permitted range of fluctuations of the volumetric efficiency is established and the actual measured fluctuations are maintained in that range by changing the fuel metered out to the engine.

Various methods for measuring the volumetric efficiency indirectly by pressure measurements in the induction tube are presented.

26 Claims, 25 Drawing Figures

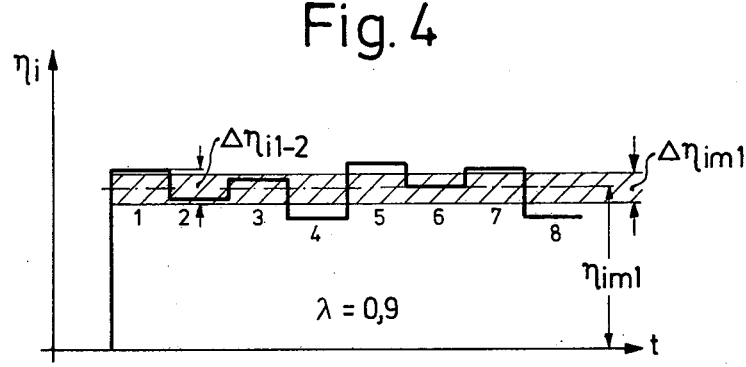
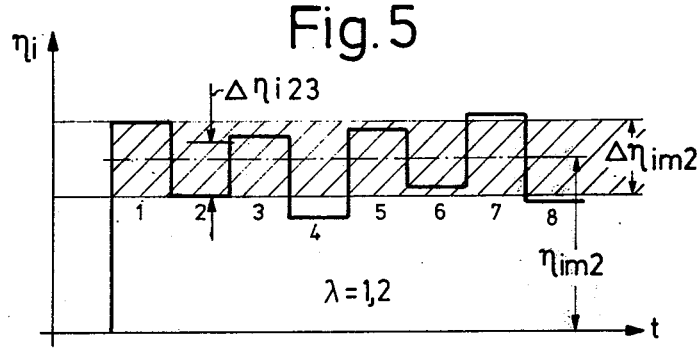
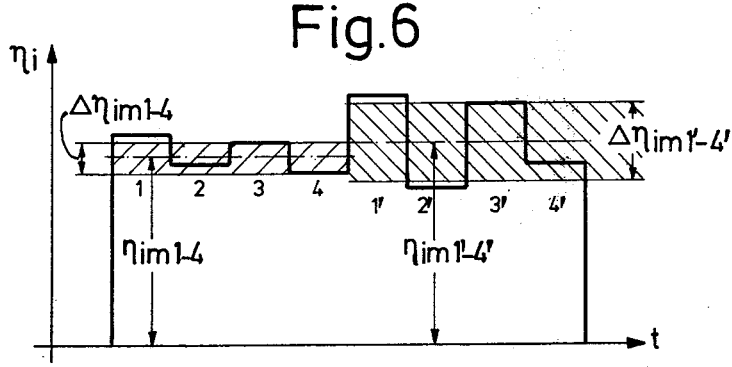

PROCESS FOR THE REGULATION OF THE OPTIMUM OPERATIONAL BEHAVIOR OF AN INTERNAL COMBUSTION ENGINE

BACKGROUND OF THE INVENTION

The invention relates to a process for the regulation of the optimum operational behavior of an internal combustion engine by engagement of the fuel-air metering device, in dependence on fluctuations of engine operating parameters.

The purpose of the process is to achieve an optimum behavior of the internal combustion engine in the entire characteristic field of operation, for example, by a corresponding consumption of fuel, composition of the exhaust gas and engine smoothness.

As is well known, whenever a piston-type internal combustion engine is operated with a mixture of fuel and air which is leaner than the stoichiometric relation, the engine exhibits irregular combustion which leads to rough running. This rough or unstable running is due to the slight dispersions in the charging coefficient from cylinder to cylinder and in successive operational cycles of the same cylinder.

An engine control process based on the magnitude of the unstable engine behavior therefore requires a quantitative and reliable measurement of the pertinent fluctuations of engine variables.

Since the irregular combustion also causes uneven rotation of the crankshaft, it has already been proposed to utilize the dispersion (scattering) of the elapsed time between angular marks on the crankshaft for the measurement of the irregularity of the combustion and to deduce therefrom the correction of the fuel quantity to be injected. However, a major disadvantage of this process is that unavoidable vibrations of the vehicle, due to irregularities in the roadbed, as well as shocks transmitted by the driving wheels through the transmission, are also transferred to the crankshaft.

It has further been proposed to use the ion current in the combustion chamber as a measuring variable for the fluctuations of combustion, and these fluctuations are adjusted to the permissible theoretical value (set-point value) by correction of the fuel-air ratio. This method requires a measuring probe in each cylinder and, apart from the expense, it raises the problem of making identical measurements in the individual cylinders and also has disadvantages due to aging.

OBJECT AND GENERAL DESCRIPTION

It is a principal object of the invention to provide a simpler process than heretofore available for the quantitative determination of the fuel-air mixture supply and/or any of its irregularities, preferably by using only a single decisive parameter for achieving an optimum fuel-air mixture.

This object is attained, according to the invention, by providing that the fluctuations of the engine's volumetric efficiency serve as a controlled variable whose measured, actual values are compared with set-point or command values of the allowed degree of fluctuation of the volumetric efficiency. Depending on the difference between the set-point value and the actual value, the ratio of fuel to air in the mixture which is being fed to the internal combustion engine can be adjusted by appropriate correction values. In this process, it is possible to determine the correct fuel-air ratio from a single value, namely the volumetric efficiency, i.e., the ratio of the inducted air volume to the cubic displacement of the engine, and to correct this ratio by regulation of the fluctuations therein, in order to obtain an optimum fuel-air ratio. Therefore, contrary to the known processes, the process of the invention uses essentially only a single parameter, namely the volumetric efficiency of the engine.

One embodiment of the invention provides a corrective interaction fuel metering system. The correct amount of fuel is determined from the magnitude of the volumetric efficiency and the fuel-air ratio is adjusted by the correcting variable until the actual value of the fluctuations of the volumetric efficiency corresponds to the predetermined set-point value.

Another embodiment of the invention provides that the correcting variable interacts with the air-metering system of the engine to adjust the metered air quantity, and hence the fuel-air ratio, until the measured, actual fluctuations of the Volumetric efficiency correspond approximately to the predetermined set-point range. The electronic circuit for processing the measured values is the same as in the case of the previous embodiment. In the present case, an electric current actuates an electrohydraulic control element, as will be explained in more detail below. Depending on the structural conditions of the engine, the measurement can take place either only at one point, at groups of cylinders, or even at each cylinder. In that way, the number of measuring points is adaptable to the special conditions of the engine. According to the invention, the measurement of the volumetric efficiency and its fluctuations can be accomplished in various ways, for example, with the aid of hot wire anemometers or by a measurement of the induction manifold pressure.

The invention is not limited to a determination of the fluctuations of the volumetric efficiency for the sole purpose of correcting the fuel-air mixture; it also pertains to the direct determination of the volumetric efficiency to define correct fuel quantity.

The measurement of induction tube pressure can be made in various known ways and, as is well known, the dynamic or static pressure is a function of the quantity of air flowing through the induction tube.

The pressure measurement according to the invention may be performed with strain gauges, pressure-sensitive semiconductors, piezoelectric elements, inductive pressure transducers or static tubes, as will be described in detail below.

In most instances it will suffice to keep the nominal value for fluctuations of the volumetric efficiency constant. In individual cases however, it might be advantageous to make this nominal value dependent on operating parameters, such as the engine temperature, ambient temperature, atmospheric air pressure and the r.p.m. of the engine. In that case, it may be suitable to vary the nominal value in dependence on the acceleration or deceleration of the r.p.m. of the engine, i.e., to enrich the mixture during acceleration, and to lean it out during deceleration.

A useful protection for the engine results from the feature that, in the case of an abrupt change of the volumetric efficiency or of its fluctuations, a warning signal is triggered or the fuel supply is stopped. Such an abrupt change of the volumetric efficiency occurs, for example, when the ignition of one or more cylinders fails. This condition is particularly dangerous whenever exhaust gas catalyzers are connected behind the engine.

These catalyzers can be quickly destroyed if raw, uncombusted fuel is fed to them due to ignition failures.

The invention also provides an electronic circuit adapted particularly well to the requirements of the proposed injection system, and the sensing of engine parameters to determine the fuel quantity to be injected takes place electronically and by way of contactless transducers.

Experience has shown that, during engine acceleration, which is usually due to an increase in the volumetric efficiency, it is very useful and effective to carry out an enrichment of the fuel-air mixture, and a corresponding leaning out during deceleration. The circuitry described by the invention can also perform this adjustment.

The electronic circuit also takes into account other engine parameters, e.g., ambient air pressure, induction air temperature, etc., which influence the optimum fuel-air ratio. The circuit is usable for continuous or intermittent injection.

The proposed electronic circuit, to be described in detail below, can use as inputs either the induction manifold pressure which is related to the volumetric efficiency or it may use the fluctuations in that variable. For the latter case, it will merely be necessary to provide an additional electronic member in the input portion of the circuit for determining the fluctuations of the voltages proportional to the induction pressure. These fluctuations are related to the fluctuations of the volumetric efficiency and this value serves as a controlled variable and is compared with a set-point value and the difference between the set-point and actual values is used as the correction value to change the fuel-air ratio.

Further novel features of the invention as well as specific steps and devices utilized therein will be recited in the appended claims. The overall nature of the invention and its operation, as well as other objects and advantages thereof will be better understood, however, from the ensuing detailed description of preferred, although merely exemplary embodiments of the invention, especially when read together with the drawing.

BRIEF DESCRIPTION OF THE DRAWING

FIGS. 4 and 5 are diagrams of the fluctuations of the volumetric efficiency depending on the prevailing fuel-air ratio;

FIG. 6 is a diagram of the effect of ignition failure in one or several cylinders on the fluctuations of the volumetric efficiency;

DESCRIPTION OF THE PREFERRED EMBODIMENTS

Figure 1:
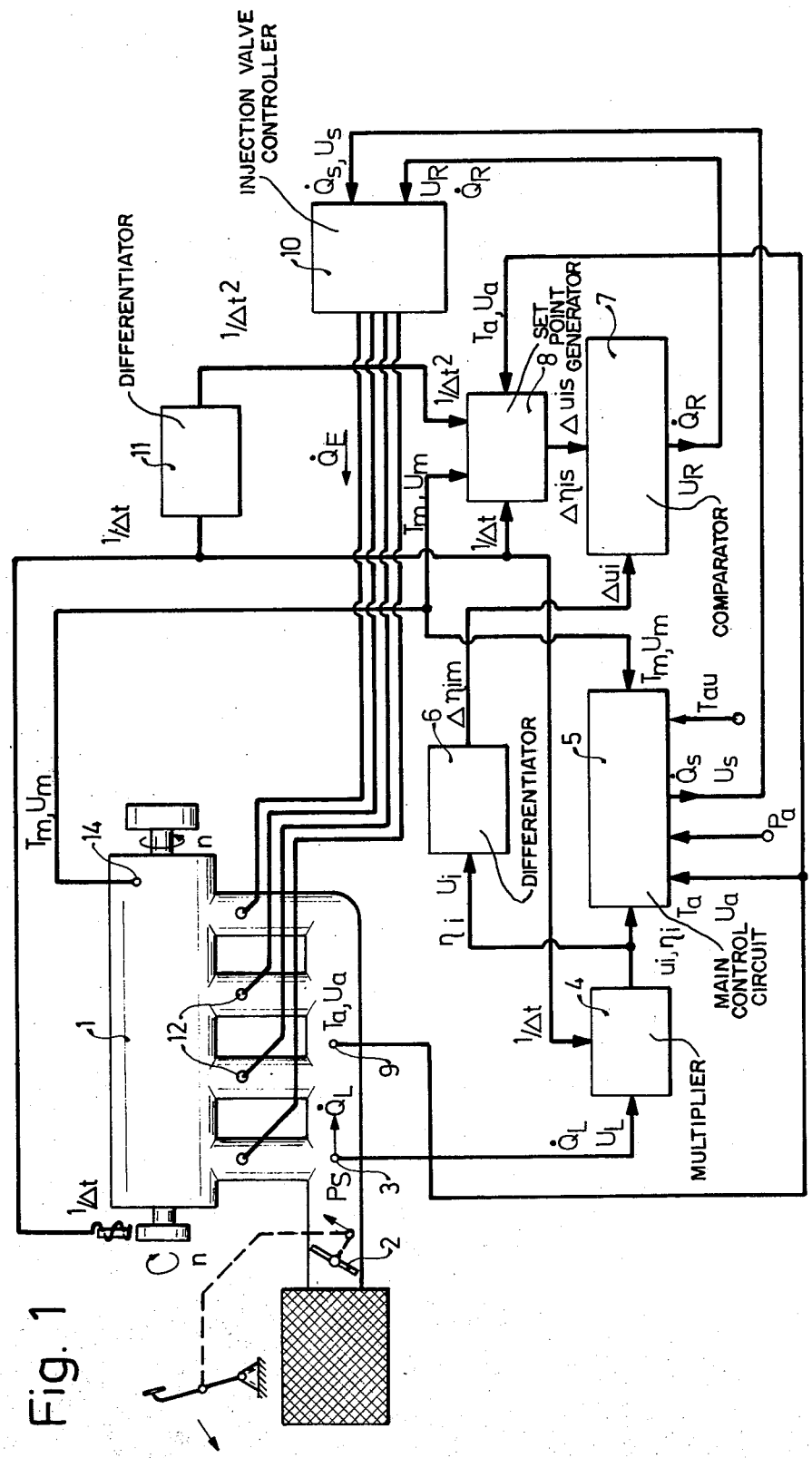
FIG. 1 is a block circuit diagram of an apparatus for measuring the quantity of air aspirated by the engine, for defining the basic fuel quantity and for corrections based on changes in the fluctuations of the volumetric efficiency.

Turning now to FIG. 1, there is shown schematically an internal combustion engine 1 equipped with a fuel injection system. In this system, a basic fuel flow rate $Q_i$ is corrected to provide the actually injected fuel flow rate $Q_E$, for which the fuel-air ratio is optimal.

Characteristic engine variables are measured and are converted into electrical signals, e.g., voltages, which are fed to electronic control instruments, shown here as block diagrams. The individual blocks are modules of an electronic controller.

A control circuit 4 supplies a signal $U_i$ to a control circuit 5. This signal corresponds to the aspirated air flow rate $Q_L$ based on the value $\Delta t$ in the control circuit 4; $\Delta t$ is related to the r.p.m. of the engine and is derived from the time of passage of markers between contactless switches. The air flow rate $Q_L$ is determined by the position of an arbitrarily operable throttle valve 2 as well as by the r.p.m. of the engine and the displacement (volume) of the engine cylinders. The quantity $Q_L$ is measured by means of a sensor device 3, which, depending on the method of measurement, either measures the time integral of the air flow rate $\dot{Q}_L$ during the intake cycle or the static pressure at the time of closure of the inlet valve. Basically, the measurement of the air flow rate $\dot{Q}_L$ or, again, of the fluctuations of the air flow rate per second, $\Delta \dot{Q}_L$, can be carried out, corresponding to the requirements of the engine, by a single flow rate meter, as shown in the FIGS. 1, 2 and 3, or by one per group of cylinders, or even individually at every cylinder.

In the control circuit 4, the signal $U_L$ for the air flow rate $\dot{Q}_L$ is converted into the signal $U_i$ by due consideration of the value $1/\Delta t$ for the air flow during every suction stroke, so that $U_i$ corresponds to the volumetric efficiency $\eta_i$ of the engine cylinders. The signal $U_i$ is then used by the control circuit 5, which will be discussed in detail below, (FIG. 22), to generate the basic fuel flow rate $\dot{Q}_S$. The basic rate $\dot{Q}_S$ can be corrected by admitting signals 9 related to, e.g., intake temperature $T_a$, engine temperature $T_m$ and atmospheric pressure $P_a$, that can be fed to the control circuit to alter the value of $U_s$ which determines $\dot{Q}_S$.

The basic quantity $\dot{Q}_S$ is further corrected and becomes the injected fuel quantity $\dot{Q}_E$, by adding or subtracting from $\dot{Q}_S$ an amount $\dot{Q}_R$. This correction takes place in the control circuit 10 which receives the signal for the base quantity $U_S$ and a correcting signal $U_R$ which can be either negative or positive. A fuel controller of suitable type is that described in U.S. Pat. No. 3,796,199. The correcting signal $U_R$ in turn, is determined in a regulating comparator circuit 7, which processes the fluctuations $\Delta\eta_{im}$ of the volumetric efficiency $\eta_i$ into a control variable. The measurement of the fluctuation of the volumetric efficiency $\eta_i$ takes place in a differentiating circuit 6. The corresponding output signal $\Delta U_i (\Delta \eta_{im} = K_2 \cdot \Delta U_i)$ is then converted in the comparator block 7 into the signal $U_R$ which is changed to a more or less large positive or negative value until the measured value of the mean fluctuation of the volumetric efficiency $\Delta\eta_{im}$ corresponds to the predetermined set-point value $\Delta \eta_{is}$. The value of the set-point value $\Delta \eta_{is}$, which is formed in the block 8, is generally constant, but it may experience some change as a result of the r.p.m. acceleration (via a differentiator 11) or due to intake temperature $T_a$ and engine temperature $T_m$ as well as through the acceleration ($1/\Delta t^2$). Basically, one strives to supply the internal combustion engine with as lean a fuel-air mixture as possible, reduced up to the running limit of the engine. As a result, the engine achieves a favorable fuel consumption, and the exhaust gas is especially poison-free.

It is suitable to define the signal $U_S$ of the basic quantity $\dot{Q}_S$ to correlate with a relatively rich fuel-air mixture. This will be effective because, according to experience, the fluctuations of the volumetric efficiency $\Delta \eta_i$ or of the control variable $\Delta \eta_{im}$ increase strongly with an increasingly lean mixture due to irregular combustion. With increasing fluctuations of the volumetric efficiency, the signal $U_R$, and hence also the injected fuel quantity $\dot{Q}_E$, decrease until the set-point value $\Delta \eta_{is}$ is reached.

If the comparator 7 fails, the main control block 5 again controls purely by way of $U_S$, i.e., it regulates a relatively rich mixture, so that the engine continues to run and will not stop because of excessive lean-out as would happen in the opposite case.

The signal $U_S$ for the basic injected fuel quantity $\dot{Q}_S$ and the signal $U_R$ for the correcting quantity are superposed in the block 10 and are processed into a controlled variable which determines the fuel quantity $\dot{Q}_E$ which is injected by the injection valves 12 directly into the induction tube or into the combustion chambers.

Thus, $\dot{Q}_L = K \cdot (U_S \pm U_R) = \dot{Q}_S \pm \dot{Q}_R$; i.e., the air flow rate $\dot{Q}_L$ is finally transformed into the fuel flow rate $\dot{Q}_E$.

The above process does not depend on whether the fuel is fed to the engine intermittently, continuously for each cylinder, or through special carburetors developed for this purpose.

Figure 2:
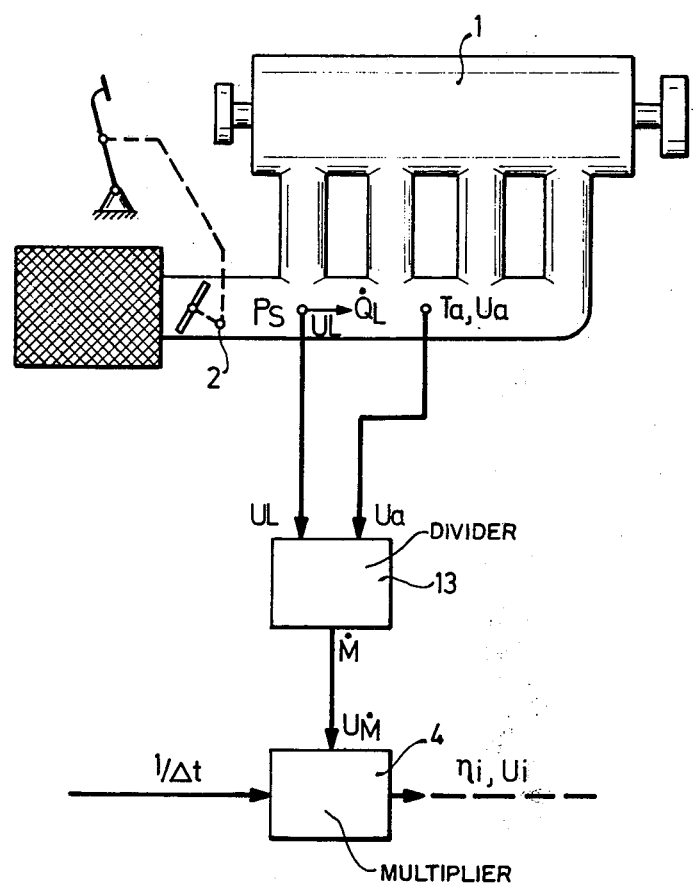
FIG. 2 shows a refined method of the measurement of the instantaneous air volume flow rate including temperature dependence.

FIG. 2 illustrates an apparatus for improving the measurement of the volumetric efficiency by taking the air temperature $T_a$ into consideration. The signal $U_L$ for the aspirated air flow rate $\dot{Q}_L$ is divided in the control block 13 by the signal $U_a$ related to the intake temperature $T_a$. As a result, the block 13 produces a signal $U_M$, proportional to the mass flow rate $\dot{M}$:

$$\dot{M} = (\gamma/g)\cdot(273/T_a)\cdot Q_L.$$

In block 4, this signal $U_M$ is divided again by the r.p.m., $1/\Delta t$. Thus, the intake temperature $T_a$ is taken into consideration in the output signal $U_i$ from the control block 4.

Figure 3:
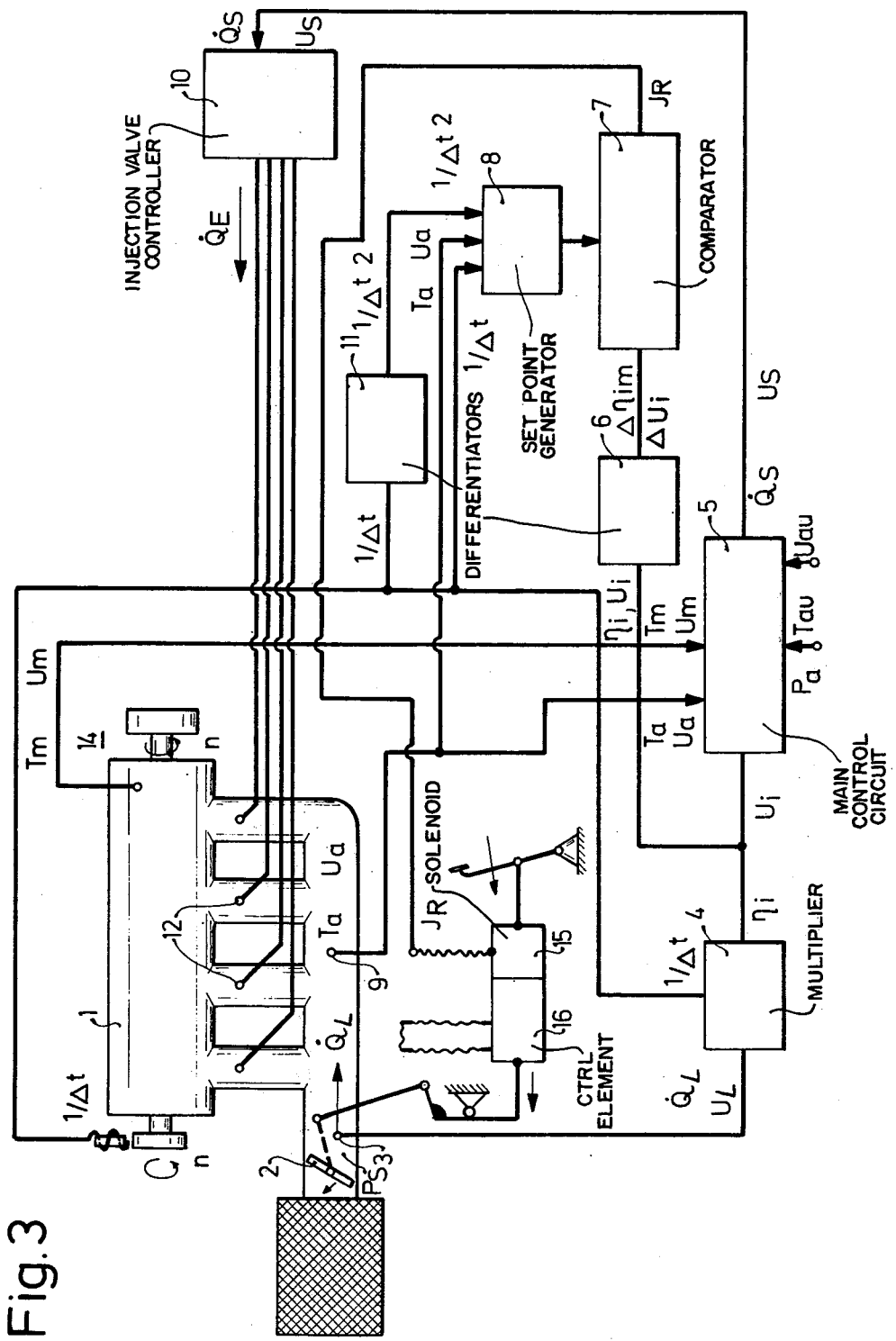
FIG. 3 is a block circuit diagram as in the case of FIG. 1, wherein the correction is achieved by changing the air flow rate.

FIG. 3 illustrates a variant embodiment of the invention. By contrast to the arrangement shown in FIG. 1, the optimum fuel-air mixture is attained here by a correction of the air flow rate.

The determination of the signal for the basic injected quantity $\dot{Q}_S$ is performed in the same manner as described with the apparatus of FIG. 1. The signal $U_i$ for the volumetric efficiency is formed from the measured air flow rate $\dot{Q}_L$ in the control block 4 through contactless switches on the crankshaft. Then, with due consideration of the intake temperature $T_a$, the engine temperature $T_m$ and atmospheric pressure $P_a$, the signal $U_S$ for the injected fuel quantity is determined in the control block 5. The conversion of the signal $U_S$ into the injected fuel flow rate $\dot{Q}_E$ takes place in the control block 10.

The fuel-air mixture is adjusted by changing the position of the throttle valve and the associated electronic circuit can be very similar to that shown in FIG. 1. The volumetric efficiency, $\eta_i$, measured in block 4, is converted in the control block 6 into the signal for the fluctuations $\Delta \eta_{im}$, and this signal is compared in the regulating block 7 with the set-point value $\Delta \eta_{is}$. The final control variable is an electric current JR which controls a magnet 15 in a hydraulic final control element 16. As a result, the position of the throttle valve 2 is adjusted continuously until the measured fluctuations of $\Delta \eta_{im}$ correspond to the set-point value $\Delta \eta_{is}$.

FIGS. 4, 5, and 6 show diagrams of the volumetric efficiency as a function of time (abscissa). In particular, FIG. 4 shows fluctuations, $\Delta \eta_i$, and the time average value, $\Delta \eta_{im}$, for a rich fuel-air mixture, e.g., $\lambda = 0.9$ (80 = 1 represents a stoichiometric mixture); the basic injected fuel quantity is determined from the signal $U_S$. $\Delta \eta_{im}$ is the controlled variable.

FIG. 5 shows that when the fuel-air mixture is leaned out ($\lambda = 1.2$), the fluctuations $\Delta \eta_{im2}$ of the volumetric efficiency $\eta_i$ become greater. This fact, as described previously, is utilized for the regulation.

Hence, the electronic circuit in the control block 7 leans out the fuel-air mixture according to the correcting signal $U_R$ until the fluctuations $\Delta\ \eta_{lm}$ have reached the predetermined value $\Delta\ \eta_{ls}$.

FIG. 6 shows how ignition failures in a cylinder cause an abrupt change of the value $\Delta\ \eta_{lm}$. Control block 5 (see FIGS. 1 and 3), where the signal $U_S$ for the basic quantity is formed, can be embodied to issue a warning signal or to stop the engine when such abrupt changes of $\Delta\ \eta_{lm}$ take place. This is important whenever catalyzers are used in the engine which could burn up if exposed to uncombusted fuel.

Figure 7:
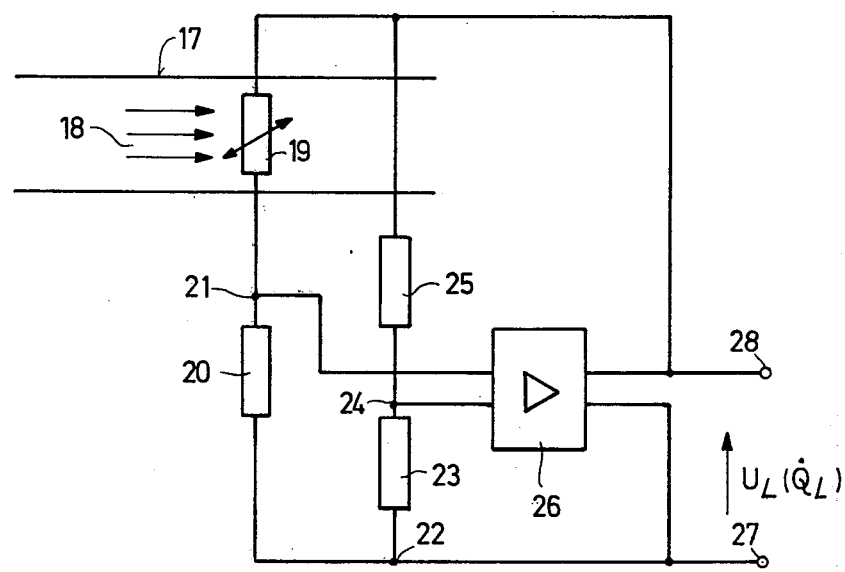
FIG. 7 is a circuit diagram for a hot-wire anemometer for measuring the aspirated air quantity and the volumetric efficiency.

The device 3 for measuring the quantities, shown in the apparatus of FIGS. 1, 2 and 3 and serving for the determination of the aspirated air quantity $\dot{Q}_L$ can be embodied variably, corresponding to the different types of measurement. FIG. 7 shows a hot wire anemometer; in this case the air quantity $\dot{Q}_L$ is determined from its cooling effect on platinum wires 19 heated by electric current, which decreases their resistance. These platinum resistances 19, 20, 23 and 25 constitute a bridge circuit with which the change of resistance of 19 can be measured very sensitively. In the control block 26, the voltage between points 21 and 24 is converted into a voltage $U_L$ for the quantity of air $\dot{Q}_L$.

Another alternative method for measuring the air flow rate is based on the measurement of the pressure in the induction tube. This method yields directly sufficiently precise results for many applications when carried out in a manner to be described below in more detail, so that the use of a correcting signal based on the fluctuations of the volumetric efficiency can be dispensed with.

Figure 8:
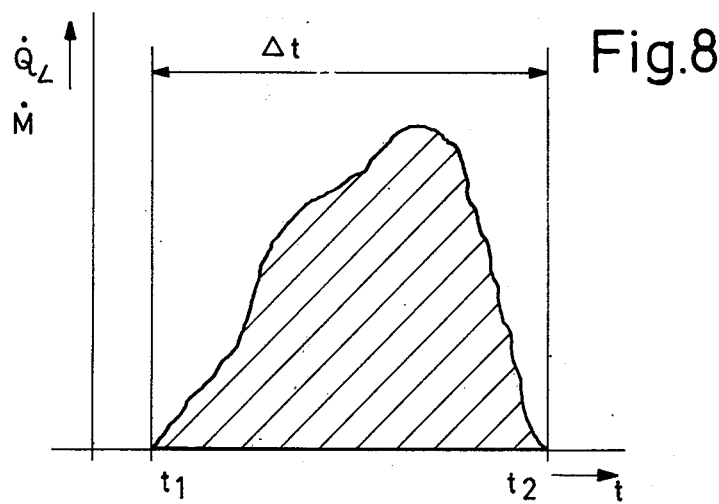
FIG. 8 is a diagram illustrating the method for measuring the volume efficiency by integration of the dynamic pressure curve.

The diagram of FIG. 8 shows the air flow rate $\dot{Q}_L$ as a function of the time (abscissa). When using the method of pressure measurement, (FIG. 8), it is suitable to measure the time integral over one intake period, thus defining the volume of air taken in per operating cycle, whereby the volumetric efficiency $\eta_l$ is determined directly. In that case:

$$\eta_l = \frac{\int_{t_1}^{t_2} Q_l\, dt}{V_H} = \frac{\int_{t_1}^{t_2} K\cdot\sqrt{P_S}\cdot dt}{V_H}$$

where $V_H$ is the displacement volume of one cylinder.

Figure 9:
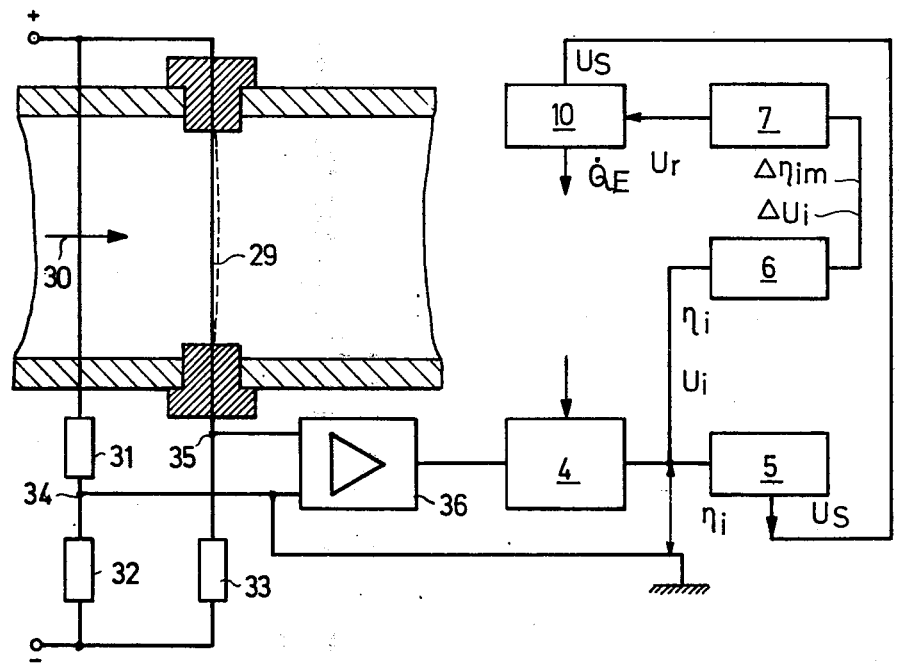
FIG. 9 shows a device for measuring dynamic pressure curve for the determination of the volumetric efficiency by means of strain gauges.

FIG. 9 shows an apparatus for determining the air flow rate through a measurement of the dynamic pressure by means of a strain gauge. The latter is glued onto a narrow, thin spring which is deflected by the flowing air in correspondence with the air velocity. The degree of deflection is determined by the strain gauge 29 by way of a bridge circuit which includes the additional resistances 31, 32 and 33, and is amplified in the amplifier 36. Integration of the square root of the pressure curve during the intake cycle yields the volumetric efficiency (see last equation). The integration takes place in block 4, the basic quantity of fuel is determined in blocks 5 and 10, and the correcting quantity is defined in blocks 6 and 7.

Figure 10:
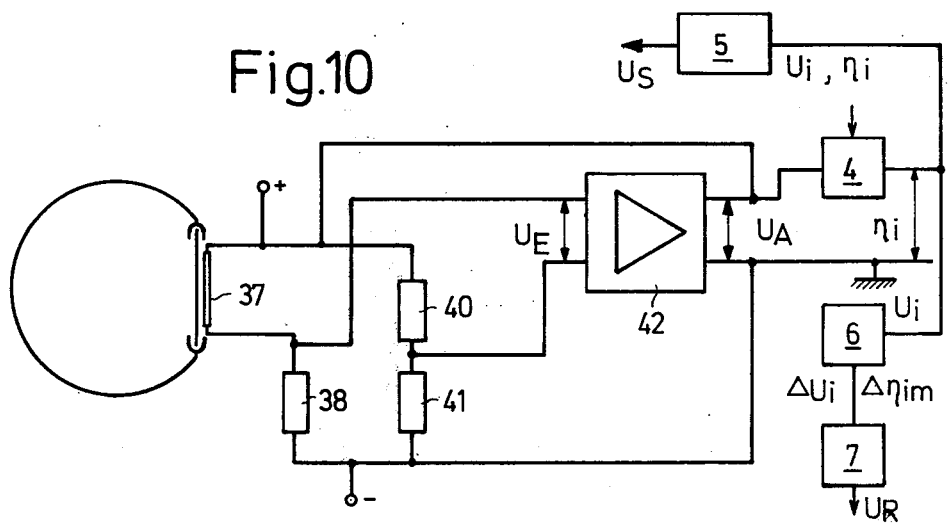
FIG. 10 is a block diagram of a device for measuring the static pressure curve for the determination of the volumetric efficiency by means of strain gauges.

In the apparatus shown in FIG. 10, the aspirated air flow is measured via a measurement of the static air pressure in the induction tube. At the instant of closing of the intake valve, the pressure in the induction tube is the same as the pressure in the cylinder and therefore is a measure for the cylinder filling, i.e, the volumetric efficiency. Therefore, in this case, the measurement of the static pressure at the end of the intake valve stroke will be sufficient in order to measure the volumetric efficiency.

Figure 11:
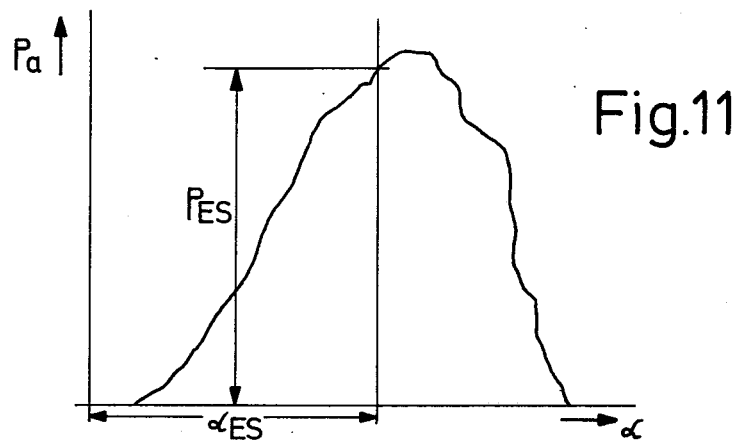
FIG. 11 is a diagram illustrating the method for measuring the volumetric efficiency by measuring the pressure at the closure of the intake valve.

A typical curve of the course of the static pressure is shown in FIG. 11, in which a point of measurement $\alpha_{ES}$ is entered. The magnitude of the volumetric efficiency obeys the function $\eta_l = K\cdot P_{ES}(\alpha_{ES})$. At the measuring point $\alpha_{ES}$, the pressure $P_{ES}$ prevails. The signal corresponding to said pressure $P_{ES}$, as shown in FIG. 10 as an example, is determined by way of the bridge consisting of the strain gauge 37 and the resistances 38, 40 and 41 and is fed, after amplification, to the control block 5 as $\eta_l$ and to the regulating block 7 as $\Delta\ \eta_{lm}$ (see FIGS. 1 and 3).

Figure 12:
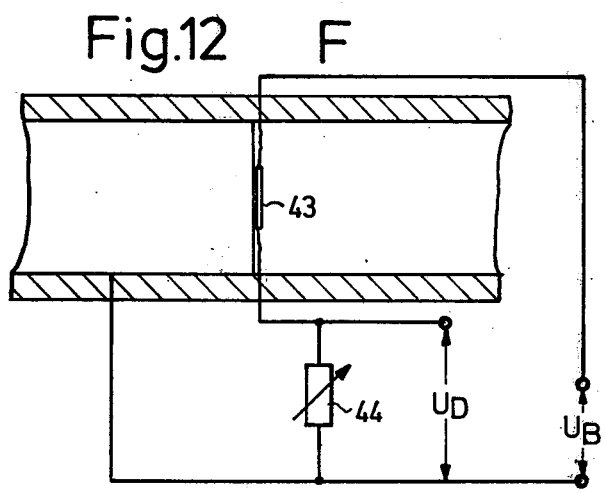
FIGS. 12 and 13 show a section and a plan view of the device for measuring the volumetric efficiency by measuring the dynamic pressure in the induction tube by means of pressure-sensitive semiconductors.
Figure 13:
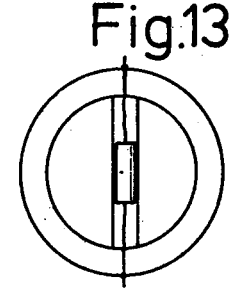

Another embodiment of the pressure sensing apparatus of the invention provides determination of the dynamic pressure by means of pressure-sensitive semiconductors 43 as illustrated in FIGS. 12 and 13. The semiconductor can be attached to a rigid wall, however the air current must strike it perpendicularly. In that case, it measures the pressure head and the superposed static pressure, since it is evacuated internally. A bridge circuit and temperature compensation are built into the pressure-sensitive semiconductor. A resistor 44 regulates the sensitivity of the measuring output.

Figure 14:
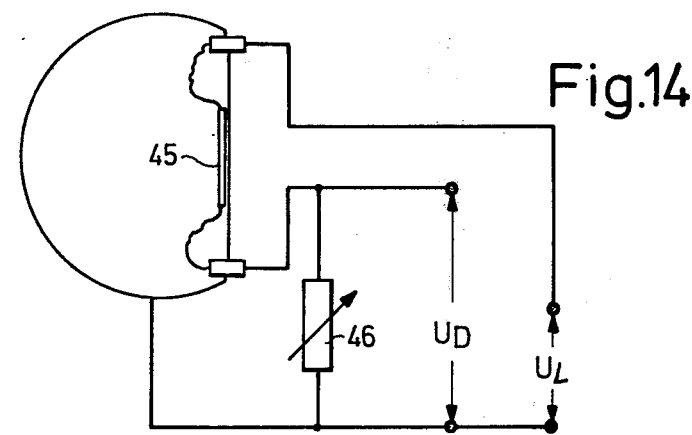
FIG. 14 illustrates a method for the measurement of the volumetric efficiency by measuring the static pressure in the induction tube by means of pressure-sensitive semiconductors.

In the example shown in FIG. 14, a pressure-sensitive semiconductor 45 is located outside of the air current, so that only the static pressure is measured. A resistor 46 regulates the sensitivity in this embodiment.

Figure 15:
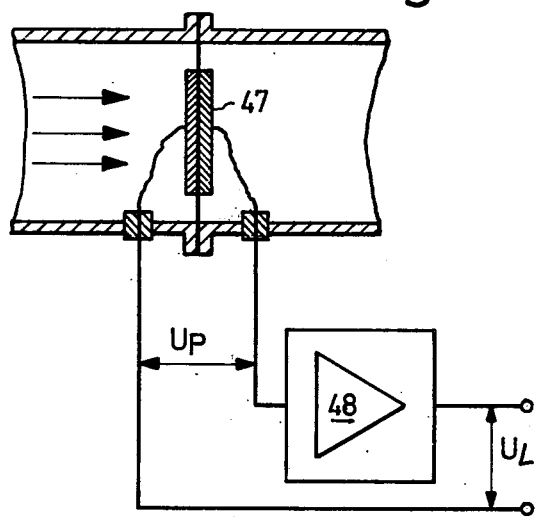
FIGS. 15 and 16 show a section and a plan view of a device for the measurement of the volumetric efficiency by measuring the dynamic pressure in the induction tube by means of piezoceramic elements.
Figure 16:
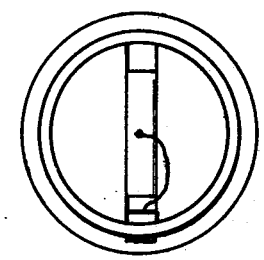

Another embodiment of a device for measuring the dynamic pressure, by means of a piezoceramic element, is shown in FIGS. 15 and 16. The pressure head bends a metal foil 47 disposed in the full air current. The deformation produces a voltage $U_p$ in a glued-on piezoceramic element 47, the magnitude of which is amplified in the amplifier 48 to form an output $U_L\cdot J_L$ for further processing.

Figure 17:
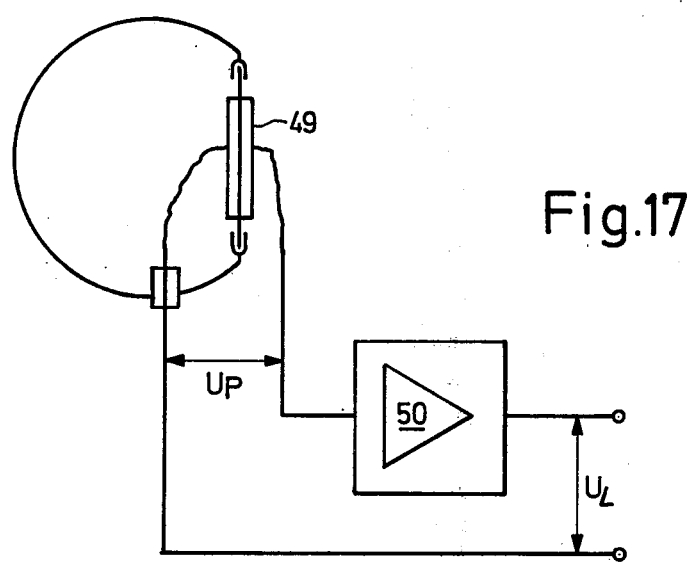
FIG. 17 illustrates a method for the measurement of volumetric efficiency by measuring the static pressure in the induction tube by means of piezoceramic elements.

The embodiment shown in FIG. 17 has the same circuit as that of FIGS. 15 and 16, however the piezoceramic element 49 does not lie in the air current and therefore only the static pressure is measured. The voltage $U_p$ is boosted in the amplifier 50 to the value $U_L\cdot J_L$.

Figure 18:
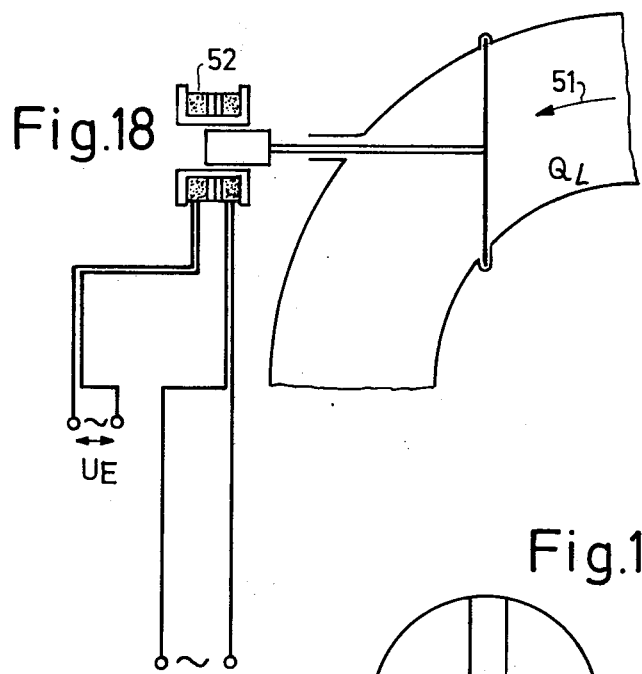
FIGS. 18 and 19 show a section and a plan view of a device for the measurement of the volumetric efficiency by measuring the dynamic pressure by means of an inductive motion pick-up.
Figure 19:
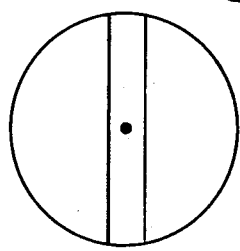

FIG. 18 shows how the dynamic pressure can be determined by means of an inductive displacement pickup: On an elastic metal sheet 51, which is deformed by the pressure head, is attached the core of an inductive displacement pickup 52. The alternating voltage $U_E$ produces an alternating voltage $U_L$ of variable amplitude, depending on the position of the core, and this voltage is amplified and rectified in the customary manner and serves as a measure for the air velocity. Since only the forces of the air cause the deflection, only the dynamic pressure is measured.

Figure 20:
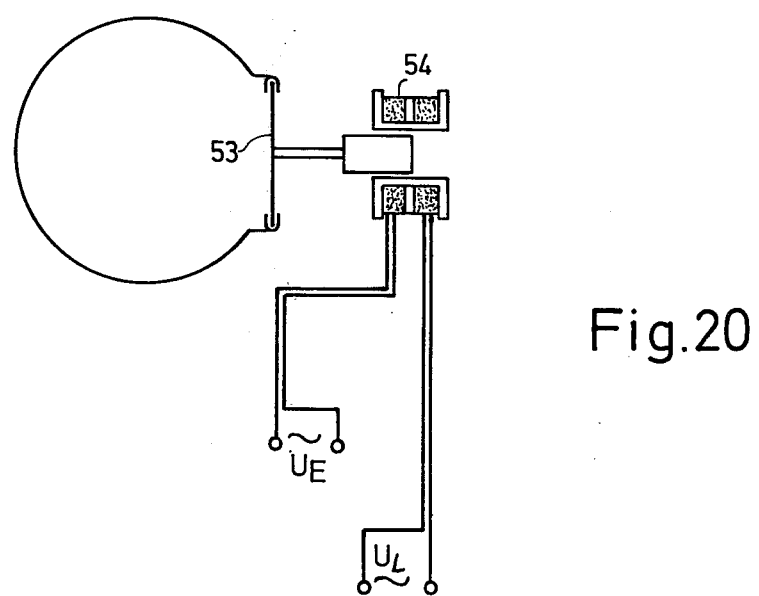
FIG. 20 illustrates a method for the measurement of the volumetric efficiency by measuring the static pressure by means of an inductive motion pick-up.

FIG. 20 shows how the static pressure may be measured by the deflection of a diaphragm 53 due to the pressure in the intake pipe, sensed by the inductive displacement pickup 54.

Figure 21:
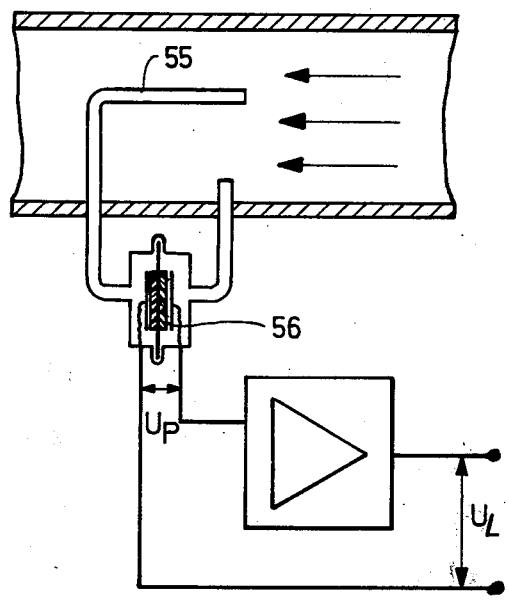
FIG. 21 illustrates a method for the measurement of the volumetric efficiency through measurement of the difference between the dynamic and the static pressure by means of a static pressure tube.

In the embodiment shown in FIG. 21, the difference between the dynamic and the static pressure is measured in the induction tube 55, so that this value is a direct measure for the intake volume (quantity). The pressure difference can be measured, for example, by one of the methods described in FIGS. 8–20. FIG. 21 shows a piezoceramic system 56 for measuring the pressure difference 55-57.

Figure 22:
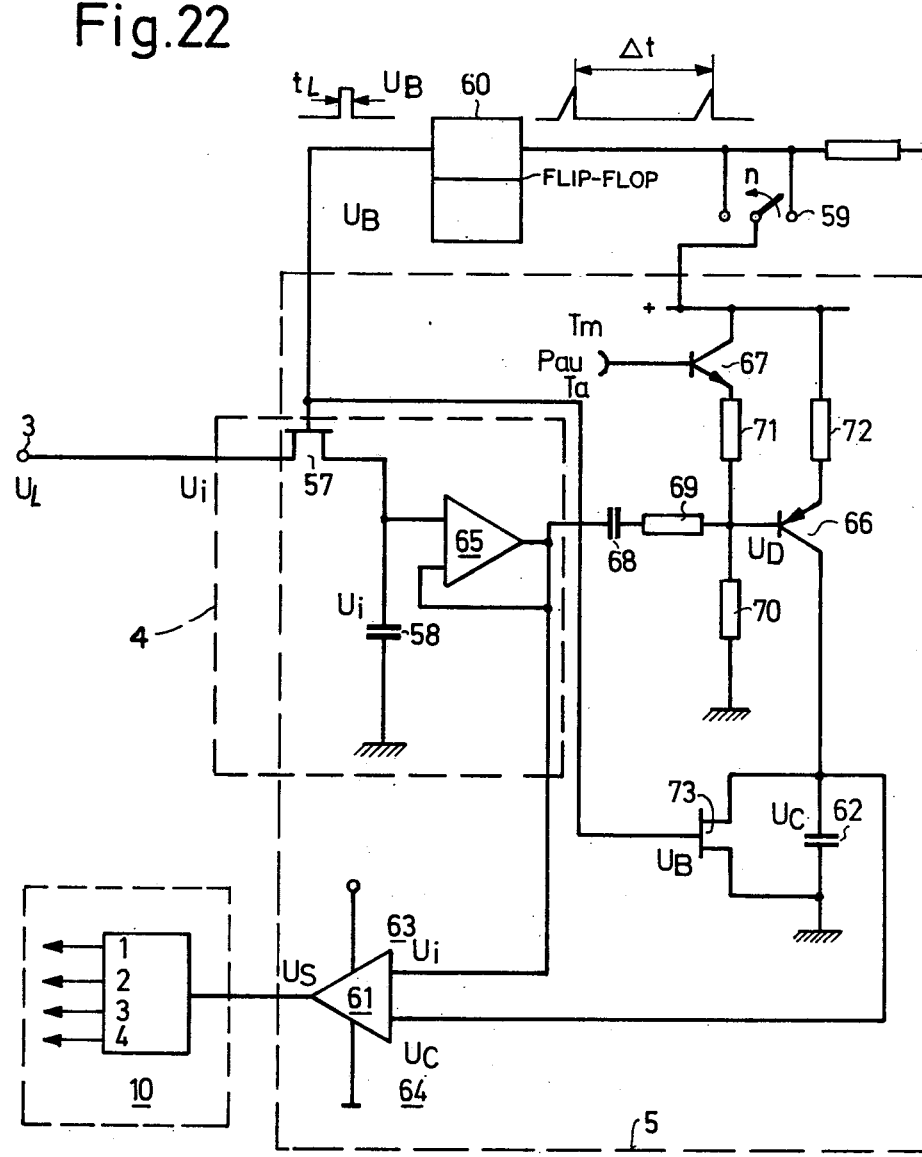
FIG. 22 shows an electronic circuit for the control and regulating system of the invention for intermittent fuel injection.

When the volumetric efficiency is measured and used to control the injected quantity, it is especially suitable to employ intermittent fuel injection. An electronic circuit to be used in that case is shown in FIG. 22. The same circuit is also suitable for measuring the fluctuation of the volumetric efficiency as a controlled variable, comparing it with the set-point value and forming the difference of the two to correct the injected fuel quantity, so that the fuel-air ratio becomes optimal. Such a combined arrangement has already been explained in the description of FIG. 1.

The circuit shown in FIG. 22 is embodied so as to control the injected fuel quantity based on the volumetric efficiency. In order to eliminate effects due to inertia and wear, the engine temperature is to be sensed without contact. The intake pressure $P_s$ ahead of the intake valve is converted by the transducer 3 into a voltage ($U_L$) which is proportional to the intake pressure. A switching pulse from the monostable multivibrator 60, which renders the field effect transistor 57 conducting, takes care that the instantaneous voltage $U_b$, corresponding to the moment of intake-valve closure, is separated from the voltage $U_L$ proportional to the intake pressure. In order to hold this momentary valve of the voltage ($U_i$) constant during one operating period of the engine, this voltge is impressed upon a capacitor 58, the charge of which is kept intact up to the next switching pulse.

The switching pulse is so short that it holds the momentary value of the voltage with sufficient precision, for its duration is only 1% of the time required for one-half revolution of the engine at maximum r.p.m.

The impedance converter 65 passes on the voltage $U_i$ unchanged but it takes care that the voltage is preserved in the capacitor 58 until a renewed switching of the field effect transistor 57. This voltage $U_i$ also goes to the inverting input 63 of the threshold switch 61, which is thereby opened and triggers the onset of injection by way of the control block 10. A field effect transistor 73, which opens together with the field effect transistor 57 whenever the monostable multivibrator 60 delivers the switching pulse, is connected to the ends of a sawtooth pulse capacitor 62. Thus, the field effect transistor 73, when conducting, short circuits the capacitor 62; the voltage $U_c$ on the capacitor becomes zero. At the end of the brief switching pulse, the field effect transistor 73 is blocked and the capacitor 62 is charged anew through the resistor 72 and the conducting transistor 66. Hence, a new sawtooth voltage pulse $U_c$ accumulates on the input 64 of the threshold switch 61, the slope of which depends on the values of resistors 72 and 66 on the value of the capacitor 62. Whenever the sawtooth voltage pulse $U_c$ and the rectangular pulse $U_i$ have the same or approximately the same value, the threshold switch 61 and, thus, the control circuit 10, are switched off, i.e., the injection is terminated.

When the injected fuel quantity is controlled by the above-described process, and when there is an increase of the induction tube pressure or the volumetric efficiency, i.e., an increased voltage $U_b$ proportional to the intake pressure, the injection pulses are extended, resulting in a larger injected fuel quantity.

It has been shown to be necessary to enrich the fuel-air mixture ratio of an engine during acceleration. Carburetors are equipped with accelerating pumps for this purpose. On the other hand, during deceleration, the mixture should be leaned out. The circuit according to the invention achieves this control due to the fact that the voltage $U_b$ proportional to the intake pressure, acts on an R-C member 69, 68 which has the characteristic of providing, for a brief time, a hyper-proportional change ($\Delta U_D$) of the constant voltage $U_D$ at the base of the transistor 66 whenever the voltage $U_i$ changes. A voltage divider, including resistors 70 and 71 and transistor 67 whose resistance is assumed, for the time being, to be constant, determines the value of the base voltage $U_D$ for the transistor 66. It has already been mentioned that the resistor 72 and the conductivity of the transistor 66 determine the slope of the sawtooth voltage $U_C$. The change of the base voltage $\Delta U_D$ also changes the conductivity of the transistor 66. During acceleration, which is always brought about by an increase of the load of the engine, the volumetric efficiency is increased, so that the voltage $U_i$, which is proportional to the intake pressure, and thus the base voltage $U_D$, become temporarily hyper-proportional due to the effect of the R-C member 68 and 69. This brings about a decrease of the conductivity of the transistor 66, i.e., the capacitor 62 is charged more slowly and the sawtooth voltage $U_c$ temporarily increases more slowly, so that the length of the injection pulse, for otherwise equal conditions, becomes temporarily longer, which results in an enrichment of the mixture during acceleration. The base of the transistor 67 may be connected to transducers for various engine variables, e.g., engine temperature, intake temperature and atmospheric pressure, so that these values will change the conductivity of the transistor 67. This causes a stationary change of the base voltage of the transistor 66 which affects the slope of the sawtooth pulse voltage $U_c$. One must take into consideration that an increase of the engine temperature and of the intake air temperature and a decrease of the atmospheric pressure must all result in a decrease of the injected fuel quantity. The circuit according to FIG. 22 can also be used for the regulation at the engine's running limit, as has already been described in detail in the description of FIG. 1.

Figure 23:
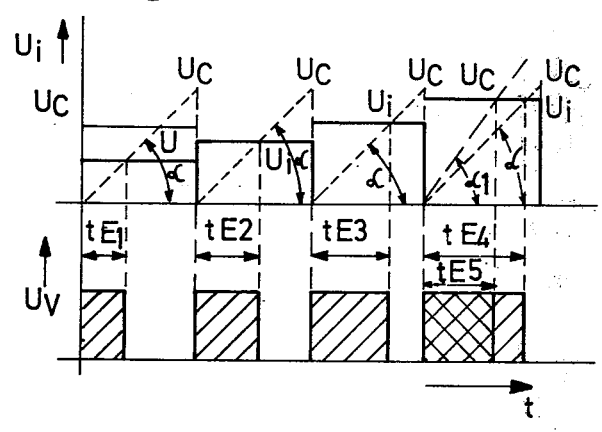
FIG. 23 is a diagram illustrating how the length of the injection pulse is defined.

FIG. 23 is a diagram showing the interaction of the rectangular pulse from the intake-pressure-dependent voltage $U_i$ and the sawtooth pulse $U_c$. The slope of the rectangular pulse $U_i$ depends on the charging time of the capacitor 58. However, the slope is shorter than 1% of the time for one-half revolution of the engine at maximum r.p.m., thus insuring almost perpendicular flanks. For the injection pulses 1 to 4 e.g. the slope of the sawtooth pulse voltage $U_c$ remains constant but there is increasing the volumetric efficiency, i.e., increasing voltages $U_i$ which are proportional to the intake pressure. FIG. 23 shows how the duration of injection rises from $t_{E1}$ to $t_{E4}$. Pulse 4 shows what effect a change of the conductivity of the transistor 66 has: Whenever the slope of the sawtooth pulse $U_c$ increases, e.g., due to a decrease of the load, a lowering of the atmospheric pressure, an increase of the intake temperature or an increase of the engine temperature, the duration of the pulse $t_{E41}$ will also be shorter, as required, i.e., a smaller quantity of fuel is injected.

Figure 24:
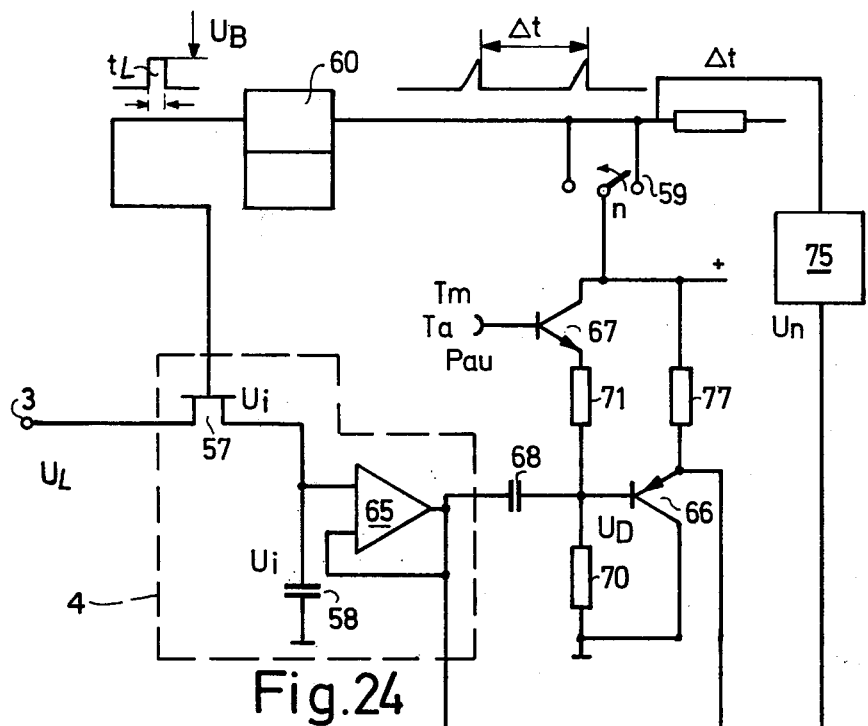
FIG. 24 is an electronic circuit for the control and regulating of the invention for continuous fuel injection.

FIG. 24 shows a similar circuit as in FIG. 22, suitable for use with continuous fuel injection. Its operation is as follows:

The transfer of the pressure-dependent voltage $U_i$ from the capacitor 58, via the impedance converter 65, takes place in the same manner as in the case of intermittent injection, and has already been described for FIG. 22. Thereafter, the processing of the input value is different. Resistors 78, 84 and the transistor 66 form a voltage divider. Assuming, at the outset, that the transistor 66 is not conductive, the voltage $U_y$ at the amplifier 81 is equal to the voltage $U_i$ emitted by the impedance converter 65. Since the amplifier 81 amplifies proportionally, it delivers a voltage $U_a$, proportional to the input voltage, and therefore also proportional to the volumetric efficiency. This voltage is multiplied in a multiplier 76 by a voltage $U_n$, based on the number of pulses triggered by the revolutions of the crankshaft and per second, i.e., proportional to the r.p.m., resulting in a product voltage $U_{n.a}$. The product of volumetric efficiency and r.p.m. is equal to the volume of air which the engine aspirates per unit time. The quantity of fuel injected per unit time is supposed to be proportional to the quantity of air aspirated per unit time. This condition is fulfilled whenever the fuel quantity control member 10 injects a quantity of fuel per second proportional to the product voltage $U_{n.a}$ and thus produces the desired fuel-air mixing ratio. To permit a change of this ratio based on other engine parameters, it will be suitable not to block the transistor 66 entirely but to leave it somewhat conductive in its normal state, so that the voltage before ($U_i$) and behind ($U_v$), respectively, the resistor 78 in the voltage divider 78, 84, 66, are different but remain mutually proportional. The fuel-air mixing ratio can now be changed by making changes in the conductivity of the transistor 66. For one thing, this is accomplished during engine accelerations, i.e., during load increases, by the capacitor 68 which takes care that an increase of the voltage $U_i$ which is proportional to the intake pressure, will trigger a hyperproportional increase of the input voltage $U_v$, to the amplifier 81, as a result of which an enrichment of the fuel-air mixture takes place during an acceleration of the engine. The hyper-proportional increase of the amplifier voltage $U_v$, comes into existence through the fact that the base voltage of the transistor 66 $U_D$ temporarily rises sharply beyond the intake pressure-dependent voltage $U_i$, whereupon the voltage $U_v$ at the input of the amplifier 81 increases hyper-proportionally as does the output voltage $U_a$ and hence also the injected fuel quantity $Q_E$ per second.

In the case of a decrease of the load, the fuel-air mixture is leaned out as required.

Various engine parameters, such as the engine temperature, intake temperature and atmospheric pressure can act upon the base of a second transistor 67, thus changing its conductivity. The transistor 67 is part of a voltage divider with the additional resistors 70 and 71. As a result of the change of the conductivity of the transistor 67, the base voltage $U_D$ of the transistor 66 is also changed and the latter then likewise changes its conductivity. A corresponding change occurs in the difference of the voltages before $U_i$ and behind $U_v$, respectively, the resistor 78, in the voltage $U_a$ behind the amplifier 81 and thus also in the fuel-air ratio.

Figure 25:
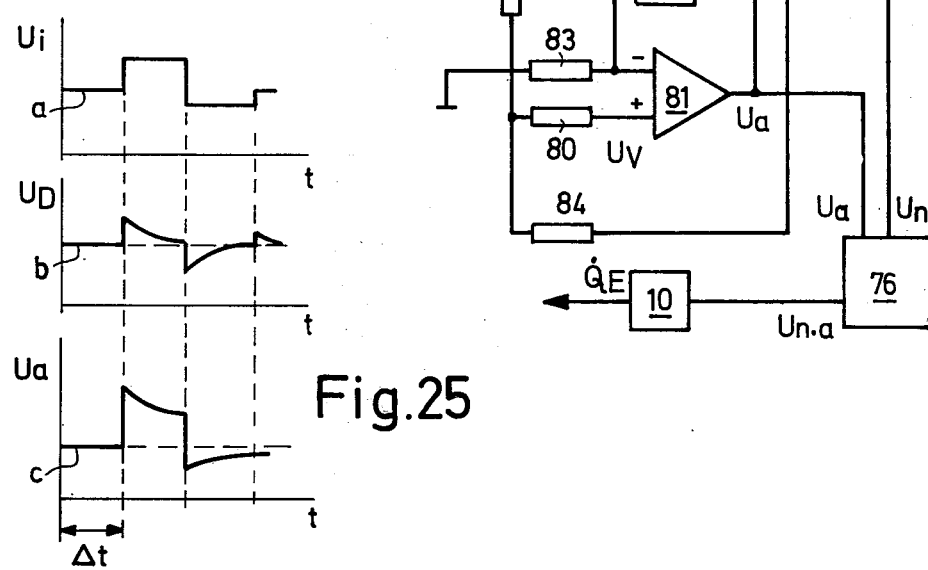
FIG. 25 is a diagram showing the time behavior of the voltage proportional to the induction pressure.

FIG. 25 shows how the output voltage $U_a$ behind the amplifier 81 changes during changes of the voltage $U_i$ which is proportional to the intake pressure. The abrupt change of the voltage $U_i$, which is proportional to the intake pressure, (FIG. 25a) results from the method of measurement. The base voltage $U_D$ of the transistor 66 is changed temporarily by the capacitor 68 during changes of the voltage $U_i$ but always drops back to the constant value $U_D$ (FIG. 25b). This results in a temporary hyperproportional change of the voltage $U_i$ behind the resistor 80 and thus also of the voltage behind the amplifier 81 $U_a$ due to the temporary change of conductivity of the transistor 66 and the influence of the change of the voltage $U_v$ ahead of the resistor 78, as shown in FIG. 25c.

What is claimed is:

1. A process for controlling the operation of an internal combustion engine, said engine including a fuel metering system, and an air flow metering system, comprising the steps of:

measuring the volumetric efficiency of said engine, generating first signals related thereto and deriving therefrom a nominal fuel quantity;

differentiating said first signals to obtain second signals related to fluctuations of said volumetric efficiency;

comparing said second signals with set-point values related to permissible magnitudes of said fluctuations;

deriving from said comparison a correction variable; and altering the prevailing fuel-air ratio of the engine in dependence on said correction variable; whereby said fluctuations of the volumetric efficiency constitute a controlled variable of the engine.

2. A process as defined by claim 1, comprising the further step of applying said correction variable to said fuel metering system to thereby alter said nominal fuel quantity until such time as said second signals related to fluctuations of the volumetric efficiency are substantially in accord with said set-point values.

3. A process as defined by claim 1, comprising the further step of applying said correction variable to said air metering system to thereby alter said nominal fuel quantity until such time as said second signals related to fluctuations of the volumetric efficiency are substantially in accord with said set-point values.

4. A process as defined by claim 1, comprising the step of measuring said volumetric efficiency and fluctuations thereof in at least one engine location.

5. A process as defined in claim 4, wherein said measurement of the volumetric efficiency and fluctuations thereof is performed with the aid of at least one hot-wire anemometer.

6. A process as defined in claim 4, wherein said measurement of the volumetric efficiency and fluctuations thereof is performed through measurements of the induction tube pressure.

7. A process as defined by claim 6, wherein said measurement of the volumetric efficiency includes mathematical integration of the induction tube pressure during the suction cycle of the engine.

8. A process as defined by claim 6, wherein said measurement of the volumetric efficiency as performed through measurements of the induction tube pressure takes place at a time just prior to the closure of the inlet valve.

9. An apparatus as defined by claim 6, wherein the measurement of the induction tube pressure is performed by strain gauges attached to resilient walls of the induction tube.

10. A process as defined by claim 6, wherein the measurement of the induction tube pressure is performed by pressure sensitive semiconductors located in the induction tube.

11. A process as defined by claim 6, wherein the measurement of the induction tube pressure is performed with the aid of piezoelectric elements disposed in the induction tube.

12. A process as defined by claim 6, wherein the measurement of the induction tube pressure takes place by means of an inductive pressure transducers.

13. A process as defined in claim 6, wherein the measurement of the induction tube pressure is obtained as the difference between static pressure and total pressure by means of a static pressure tube.

14. A process as defined in claim 6, wherein said measurement of the volumetric efficiency includes obtaining the mathematical quotient of the pressure and the mean air temperature in the induction tube.

15. A process as defined by claim 6, wherein said set-point value of the fluctuations in the volumetric efficiency may be altered by the application of signals corresponding to operational variables such as engine temperature, ambient temperature, ambient air pressure, and engine r.p.m.

16. A process as defined by claim 1, wherein the said set-point values of the fluctuations in the volumetric efficiency are changed in dependence on engine velocity changes in such a manner that when the engine accelerates the fuel-air mixture is enriched and when the engine decelerates the fuel-air mixture is leaned out depending on the magnitude of the change in the volumetric efficiency.

17. A process as defined by claim 16, wherein a warning signal is triggered or fuel supply is interrupted when the volumetric efficiency changes faster than at a predetermined rate.

18. A process as defined by claim 1, comprising the further step of measuring the volumetric efficiency of the engine and deriving therefrom a nominal fuel quantity by contactless sensors and measuring and sensing a plurality of other engine variables with contactless sensors.

19. A process as defined by claim 1 wherein the first step includes:
    measuring the induction tube pressure at the time of closure of the inlet valve;
    transforming said measured pressure into an electrical voltage by means of a transducer;
    amplifying said voltage related to the induction tube pressure;
    applying said voltage to the inverting input of a threshold switch, said voltage being applied in r.p.m. synchronous manner to a capacitor when an electronic switch delivers a spike pulse wherein as a consequence a monostable multivibrator delivers a square switching pulse to the base of a first field-effect transistor whereby a voltage is transmitted from said capacitor via an impedance transformer to said threshold switch which thereby conducts and produces a second voltage which is fed to a control circuit for triggering fuel injection which is maintained until a sawtooth pulse generated by charging a second capacitor and applied to the non-inverting input of said threshold switch has reached the voltage of said rectangular pulse applied to the inverting input of said threshold switch, whereby when the voltages at said two inputs of said threshold switch are equal, fuel injection is terminated.

20. A process as defined by claim 19, wherein an electronic switch actuated by the cam shaft of the engine triggers a monostable multivibrator to form a rectangular pulse whose duration is preferably 1% of one-half engine revolution at maximum engine r.p.m., and said first field-effect transistor connects said amplifier which delivers induction tube pressure proportional voltages with said capacitor and whereby said capacitor acquires the same voltage as the output voltage from said amplifier during the duration of said switching pulse.

21. A process as defined by claim 19, wherein the electronic switch actuated by the cam shaft of the engine generates sharp pulses which trigger said monostable multivibrator thereby delivering a square pulse which switches said first field-effect transistor and the onset of injection and also switches a second field-effect transistor connected to two ends of a sawtooth pulse capacitor which is thereby short circuited and discharged and wherein said second field-effect transistor blocks at the end of the switching pulse from said monostable multivibrator.

22. A process as defined by claim 19, wherein said induction tube proportional voltage is supplied to said impedance transformer and subsequently to an R-C member and hence to the base of a transistor which charges said sawtooth capacitor so that the resulting voltage change is superimposed on the voltage from a voltage divider after which the charging transistor alters its conductivity and thereby alters the slope of said sawtooth voltage which is applied to one input of said threshold switch, whereby, when the induction tube pressure temporarily increases, a hyper-proportional increase of the injected fuel quantity results while when the induction tube pressure decreases, the fuel-air mixture is leaned out.

23. A process as defined by claim 22, wherein the voltage at the base of said transistor may be changed by a supplementary transistor within said voltage divider by applying to the base of said supplementary transistor signals related to operational parameters such as induction air temperature, ambient air pressure, engine temperature.

24. A process as defined by claim 1, further comprising the steps of:
    measuring the pressure in the induction tube, transforming it into a voltage and amplifying said voltage and applying said voltage to a field-effect transistor which conducts during duration of a pulse from a monostable multivibrator and transmits said voltage to a capacitor from which it is fed via an impedance converter and resistors to the input of an amplifier whose output voltage is fed to a multiplying circuit to which is applied an r.p.m.-dependent voltage derived by an r.p.m. tachometer by pulses related to the crankshaft r.p.m., thereby producing in the multiplying circuit a new voltage proportional to the aspirated air flow rate in the induction tube of the engine which is applied to said fuel control system to deliver a fuel quantity proportional to said air quantity.

25. A process as defined in claim 24, wherein said induction tube proportional voltage fed to said amplifier may be changed by means of a voltage divider consisting of resistors and a transistor in such a manner that changes in the pressure proportional voltage are passed through said impedance converter and a capacitor to the base of a transistor in such a way that an enlargement of the volumetric efficiency of the engine produces a temporary enrichment of the fuel-air mixture, while a decrease in the volumetric efficiency produces a leaning out of the fuel-air mixture.

26. A process as defined by claim 24, including the further steps of providing a second voltage divider including two resistors for providing the constant base voltage of the sawtooth generating transistor, thereby determining the mixture enrichment and further providing a transistor in series with said resistors whose base is connected to signal sources related to operational parameters, for example, engine temperature, induction air temperature, ambient pressure, and the like, whereby said first voltage divider associated with said amplifier is affected to alter the fuel-air mixture in desired manner.

* * * * *